(12) United States Patent
Kitamura et al.

(10) Patent No.: US 9,002,164 B2
(45) Date of Patent: Apr. 7, 2015

(54) OPTICAL FIBER AND METHOD OF MANUFACTURING THE SAME

(71) Applicant: Fujikura, Ltd., Koto-ku, Tokyo (JP)

(72) Inventors: Takayuki Kitamura, Sakura (JP); Akihito Imase, Sakura (JP); Munehisa Fujimaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 128 days.

(21) Appl. No.: 13/781,041

(22) Filed: Feb. 28, 2013

(65) Prior Publication Data

US 2014/0241686 A1   Aug. 28, 2014

(51) Int. Cl.
*G02B 6/036* (2006.01)
*G02B 6/02* (2006.01)

(52) U.S. Cl.
CPC .......... *G02B 6/02019* (2013.01); *G02B 6/0365* (2013.01)

(58) Field of Classification Search
CPC .................................................. G02B 6/0365
USPC ........................................................ 385/127
See application file for complete search history.

(56) References Cited

U.S. PATENT DOCUMENTS

| | | |
|---|---|---|
| 4,852,968 A | 8/1989 | Reed |
| 6,483,975 B1 | 11/2002 | Hsu et al. |
| 6,535,679 B2 | 3/2003 | Yokoyama et al. |
| 6,694,079 B1 | 2/2004 | Matsuo et al. |
| 6,901,196 B2 | 5/2005 | Takahashi et al. |
| 6,904,218 B2 | 6/2005 | Sun et al. |
| 7,164,835 B2 | 1/2007 | Matsuo et al. |
| 7,187,833 B2 | 3/2007 | Mishra |
| 7,254,305 B2 | 8/2007 | Mishra |
| 7,440,663 B2 | 10/2008 | Matsuo et al. |
| 7,450,807 B2 | 11/2008 | Bickham et al. |
| 7,555,187 B2 | 6/2009 | Bickham et al. |
| 7,773,848 B2 * | 8/2010 | Bookbinder et al. .......... 385/127 |
| 8,041,172 B2 | 10/2011 | Sillard et al. |
| 8,073,310 B2 | 12/2011 | Koda et al. |
| 8,218,929 B2 | 7/2012 | Bickham et al. |
| 8,295,668 B2 | 10/2012 | Gibson et al. |
| 8,301,001 B2 * | 10/2012 | Nakanishi et al. ............ 385/126 |
| 8,315,493 B2 | 11/2012 | Gibson et al. |
| 8,315,494 B2 * | 11/2012 | Tsuchida et al. .............. 385/127 |
| 8,724,954 B2 * | 5/2014 | Konishi et al. ................ 385/128 |
| 8,768,129 B2 * | 7/2014 | Peckham et al. .............. 385/124 |
| 2006/0039665 A1 * | 2/2006 | Matsuo et al. ................ 385/127 |
| 2007/0003198 A1 | 1/2007 | Gibson et al. |
| 2011/0188826 A1 | 8/2011 | Sillard et al. |
| 2012/0051703 A1 * | 3/2012 | Bigot-Astruc et al. ....... 385/124 |

FOREIGN PATENT DOCUMENTS

| | | |
|---|---|---|
| CN | 1576916 A | 2/2005 |
| EP | 2352047 A1 | 8/2011 |
| FR | 1050697 | 1/1954 |
| FR | 1055368 | 2/1954 |
| FR | 2914751 A1 | 10/2008 |

(Continued)

*Primary Examiner* — Daniel Petkovsek
(74) *Attorney, Agent, or Firm* — Sughrue Mion, PLLC

(57) ABSTRACT

An optical fiber is provided. The optical fiber has a refractive index profile that includes a central core, an inner cladding layer, a trench layer, and an outer cladding layer. A trench layer is provided with a reduced refractive index. The optical fiber has a large effective area without having an increase of a cutoff wavelength, and exhibits low macrobending loss.

5 Claims, 3 Drawing Sheets

(56) References Cited

FOREIGN PATENT DOCUMENTS

| | | | |
|---|---|---|---|
| FR | 2962230 | A1 | 1/2012 |
| JP | 10206669 | A | 8/1998 |
| JP | 2000067894 | A | 3/2000 |
| JP | 3808291 | B2 | 8/2006 |
| JP | 3853833 | B2 | 12/2006 |
| JP | 4833071 | B2 | 12/2011 |

* cited by examiner

FIG. 2

| Entry | $\Delta_1$ | $\Delta_2$ | $\Delta_3$ | $\Delta_1-\Delta_2$ | $\Delta_2-\Delta_3$ | $r_1$ | $r_2$ | $r_3$ | $r_2/r_1$ | $w_3$ | $w_3/r_1$ | $A_{eff}$ 1550 $\mu m^2$ | $\lambda_{cc}$ nm | macrobending loss R15 dB/10 turns |
|---|---|---|---|---|---|---|---|---|---|---|---|---|---|---|
| | | | | | | μm | μm | μm | | μm | | | | |
| 1 | 0.311 | 0.037 | -0.161 | 0.274 | 0.198 | 4.5 | 18.8 | 26.2 | 4.18 | 7.4 | 1.64 | 103.43 | 1452 | 0.035 |
| 2 | 0.309 | 0.040 | -0.166 | 0.269 | 0.206 | 4.5 | 18.8 | 26.5 | 4.18 | 7.7 | 1.71 | 100.60 | 1427 | 0.013 |
| 3 | 0.306 | 0.038 | -0.175 | 0.268 | 0.213 | 4.6 | 19.2 | 27.0 | 4.17 | 7.8 | 1.70 | 103.40 | 1448 | 0.007 |
| 4 | 0.289 | 0.049 | -0.177 | 0.240 | 0.226 | 4.7 | 17.5 | 25.1 | 3.72 | 7.6 | 1.62 | 100.27 | 1430 | 0.037 |
| 5 | 0.306 | 0.037 | -0.170 | 0.269 | 0.207 | 4.8 | 19.6 | 27.4 | 4.08 | 7.8 | 1.63 | 104.27 | 1483 | 0.008 |
| 6 | 0.311 | 0.045 | -0.168 | 0.266 | 0.213 | 4.8 | 19.9 | 27.7 | 4.15 | 7.8 | 1.63 | 102.76 | 1477 | 0.004 |
| 7 | 0.290 | 0.046 | -0.178 | 0.244 | 0.224 | 5.0 | 18.2 | 26.0 | 3.64 | 7.8 | 1.56 | 110.01 | 1458 | 0.011 |
| 8 | 0.174 | -0.038 | -0.188 | 0.211 | 0.150 | 5.1 | 16.5 | 28.3 | 3.24 | 11.8 | 2.31 | 124.11 | 1301 | 0.185 |
| 9 | 0.169 | -0.051 | -0.193 | 0.220 | 0.142 | 5.4 | 16.3 | 27.1 | 3.02 | 10.8 | 2.00 | 126.44 | 1324 | 0.156 |
| 10 | 0.179 | -0.039 | -0.187 | 0.217 | 0.148 | 5.5 | 17.7 | 29.1 | 3.22 | 11.4 | 2.07 | 128.76 | 1326 | 0.235 |
| 11 | 0.168 | -0.052 | -0.189 | 0.220 | 0.138 | 5.7 | 17.5 | 28.9 | 3.02 | 11.4 | 1.97 | 133.68 | 1409 | 0.096 |
| 12 | 0.311 | 0.040 | -0.171 | 0.271 | 0.211 | 5.1 | 21.4 | 29.5 | 4.20 | 8.1 | 1.59 | 107.87 | 1589 | 0.002 |
| 13 | 0.256 | 0.022 | -0.196 | 0.234 | 0.218 | 5.8 | 20.9 | 30.1 | 3.60 | 9.2 | 1.59 | 122.97 | 1564 | 0.011 |
| 14 | 0.170 | -0.046 | -0.274 | 0.216 | 0.228 | 5.9 | 18.4 | 27.5 | 3.12 | 9.1 | 1.54 | 140.31 | 1529 | 0.026 |
| 15 | 0.175 | -0.040 | -0.271 | 0.216 | 0.231 | 6.2 | 19.1 | 28.5 | 3.08 | 9.4 | 1.52 | 145.48 | 1650 | 0.018 |
| 16 | 0.183 | -0.038 | -0.177 | 0.221 | 0.139 | 4.3 | 14.2 | 23.8 | 3.30 | 9.6 | 2.23 | 113.22 | 1121 | 1.694 |
| 17 | 0.180 | -0.044 | -0.179 | 0.224 | 0.135 | 4.5 | 14.8 | 24.8 | 3.29 | 10.0 | 2.22 | 113.71 | 1143 | 1.333 |
| 18 | 0.170 | -0.053 | -0.198 | 0.223 | 0.145 | 4.7 | 15.2 | 25.7 | 3.23 | 10.5 | 2.23 | 117.23 | 1182 | 0.816 |
| 19 | 0.182 | -0.034 | -0.188 | 0.216 | 0.153 | 4.9 | 15.8 | 27.3 | 3.22 | 11.5 | 2.35 | 121.81 | 1270 | 0.570 |

(12) United States Patent
US 9,002,164 B2

OPTICAL FIBER AND METHOD OF MANUFACTURING THE SAME

BACKGROUND

1. Field

The present disclosure relates to an optical fiber and, more particularly, to a single-mode optical fiber with a large effective area that exhibits a low attenuation loss and a low bending loss and that has a broad wavelength range of operation, and a method of manufacturing the same.

2. Description of the Related Art

In wavelength division multiplexing (WDM) systems, several channels with different wavelengths of signals are multiplexed onto a single optical fiber. As the number of channels in the WDM system increases, more optical power has to be carried by the single optical fiber. Accordingly, nonlinear optical effects, such as non-linear scattering, four-wave-mixing, self-phase modulation, cross-phase modulation, and so on, caused by interaction between the channels becomes more significant. Optical fibers having a large effective area have been developed to reduce these non-linear effects in long haul transmission of information. Large effective area optical fibers allow the transfer of a large number of signals by reducing the density of the optical power in the single optical fiber.

In a large effective area optical fiber, an electromagnetic field in an optical fiber is expanded from the core portion of the optical fiber to an outer cladding portion of the optical fiber as compared to a standard single-mode optical fiber (SSMF) as defined in Telecommunication Standardization Sector of International Telecommunication Union (ITU-T) G.652. Thus, as the distribution of the electromagnetic field is spread over the optical fiber, a macrobending loss increases significantly. As used in the present disclosure, "macrobending loss" refers to a bending-induced excess loss as the optical fiber is physically bent as compared to "microbending loss" that refers to a loss that is randomly applied within the fiber such as may occur on a small scale if sandpaper is run over the optical fiber.

The macrobending loss may be suppressed by introducing a trench into the outer cladding portion, where the trench has a lower refractive index compared to the cladding portion. As the refractive index of the trench becomes lower, the macrobending loss becomes lower. However, as the refractive index of the trench becomes lower, it is necessary to dope more down-doping dopant in the optical fiber at the trench. This increased dopant causes the manufacturing process to become more complex and costly.

Additionally, as noted above as the effective area of the optical fiber increases, the macrobending loss performance of the fiber decreases. Thus, it is difficult to produce an optical fiber that has good macrobending loss characteristics (i.e., a low macrobending loss) while also having a large effective area.

SUMMARY

It is an aspect of one or more exemplary embodiments to provide an optical fiber that exhibits a large effective area and a low macrobending loss at the same time, and that can be manufactured at a low production cost.

According to an aspect of an exemplary embodiment, there is provided an optical fiber comprising a core having an outer radius $r_1$ and a refractive index $n_1$; an inner cladding layer provided on a periphery of the core, the inner cladding layer having an outer radius $r_2$ and a refractive index $n_2$; a trench layer provided on a periphery of the inner cladding layer, the trench layer having an outer radius $r_3$ and a refractive index $n_3$; and an outer cladding layer provided on a periphery of the trench layer, the outer cladding layer having an outer radius $r_4$ and a refractive index $n_4$, wherein a maximum refractive index of the core $n_{1max}$ is greater than $n_2$, $n_3$, and $n_4$, a minimum refractive index of the trench layer $n_{3min}$ is less than $n_1$, $n_2$, and $n_4$, a relative refractive index difference of a minimum refractive index of the trench layer to the refractive index of the outer cladding layer $\Delta_{3min}$ is between about −0.30% and about −0.15%, an effective area $A_{eff}$ at a wavelength of 1550 nm is from about 100 μm² to about 140 μm², and a macrobending loss at a wavelength of 1550 nm is less than about 0.5 dB for 10 turns at a bending radius of 15 mm, and a cable cutoff wavelength with substantially single-mode propagation is about 1460 nm to about 1625 nm.

According to another aspect of one or more exemplary embodiments, there is provided a method of manufacturing the optical fiber, the method comprising preparing a first glass body of a central portion that corresponds to the core and the inner cladding layer; depositing a first porous glass body that corresponds to the trench layer on an outer surface of the first glass body by vapor phase deposition; sintering the first porous glass body in an atmosphere containing a fluorine-containing reagent to obtain a second glass body; depositing a second porous glass body that corresponds to the outer cladding layer on an outer surface of the second glass body by vapor phase deposition; sintering the second porous glass body to obtain an optical fiber preform; and drawing out the optical fiber preform while heating one end of the optical fiber preform to form the optical fiber.

According to an aspect of an exemplary embodiment, there is provided an optical fiber comprising a core having an outer radius $r_1$ and a refractive index $n_1$; an inner cladding layer provided on a periphery of the core, the inner cladding layer having an outer radius $r_2$ and a refractive index $n_2$; a trench layer provided on a periphery of the inner cladding layer, the trench layer having an outer radius $r_3$ and a refractive index $n_3$; and an outer cladding layer provided on a periphery of the trench layer, the outer cladding layer having an outer radius $r_4$ and a refractive index $n_4$, wherein a maximum refractive index of the core $n_{1max}$ is greater than $n_2$, $n_3$, and $n_4$, a minimum refractive index of the trench layer $n_{3min}$ is less than $n_1$, $n_2$, and $n_4$, a relative refractive index difference of a minimum refractive index of the trench layer to the refractive index of the outer cladding layer $\Delta_{3min}$ is between about −0.30% and about −0.15%, an effective area $A_{eff}$ at a wavelength of 1550 nm is from about 100 μm² to about 140 μm², a macrobending loss at a wavelength of 1550 nm is less than about 0.3 dB for 10 turns at a bending radius of 15 mm, and a cable cutoff wavelength is about 1300 nm to about 1500 nm.

BRIEF DESCRIPTION OF THE DRAWINGS

These above and/or other aspects will become apparent and more readily appreciated from the following description of exemplary embodiments, taken in conjunction with the accompanying drawings in which:

FIG. 2 shows data of illustrative examples of optical fibers according to exemplary embodiments as compared to data of comparative examples.

DETAILED DESCRIPTION

Hereinafter, exemplary embodiments will be described in detail with reference to the accompanying drawings.

The inventor has found that there is a contradictory aspect between a large effective area and a low macrobending loss of an optical fiber. It is possible to introduce a trench layer in a refractive index profile of an optical fiber for lowering macrobending loss. A "refractive index profile" as used in the present disclosure denotes a relationship between refractive index or refractive index difference and a radius of an optical fiber. While trench layers have been applied to optical fibers, the optical fibers to which a trench layer has been applied are generally optical fibers having an effective area ($A_{eff}$) comparable to that of a SSMF, and comply with the recommendations of ITU-T G.657. By contrast, optical fibers with a large effective area ($A_{eff}$) generally have either poor macrobending loss performance or only a moderately reduced macrobending loss.

While it is possible to produce an optical fiber that exhibits a relatively large effective area ($A_{eff}$) and a relatively low macrobending loss, these fibers either require the addition of microstructures such as holes filled with an inert gas and/or require a very low refractive index difference of the trench, both of which make the optical fibers expensive and complex to manufacture. For example, in order to achieve simultaneously an effective area ($A_{eff}$) at a wavelength of 1550 nm that is larger than 100 $\mu m^2$ and a low macrobending loss for a bending radius of 15 mm at a wavelength of 1550 nm of less than 0.5 dB for 10 turns, it is required to introduce a very low refractive index at a trench layer, for example having a refractive index difference lower than −0.3%, or to introduce a microstructure in a cladding portion.

It is thus an aspect of one or more exemplary embodiments to provide an optical fiber that exhibits a large effective area and a low macrobending loss at the same time, and can be manufactured at a low production cost.

Figure 1:
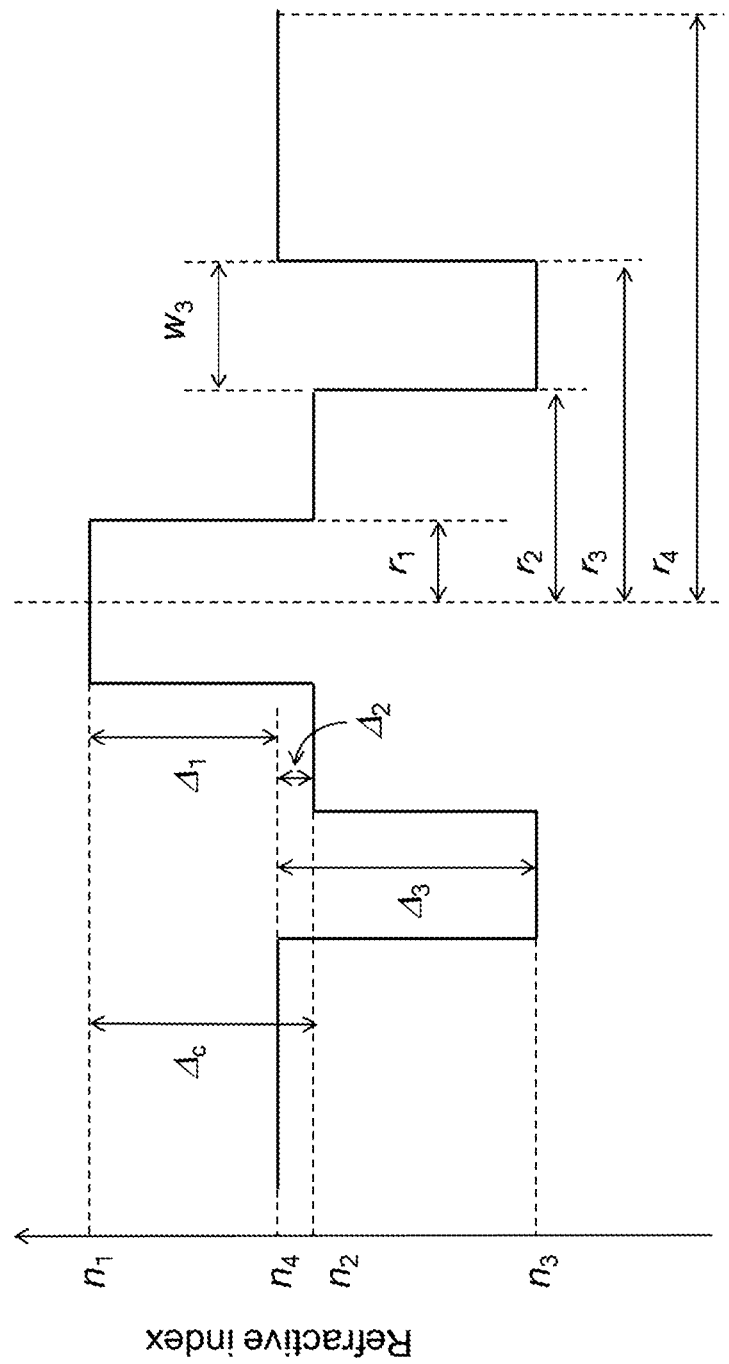
FIG. 1 shows a refractive index profile of an optical fiber according to an exemplary embodiment.

FIG. 1 illustrates a refractive index profile of an optical fiber according to an exemplary embodiment. The refractive index profile includes a step-index core with a depressed trench layer design. The profile has a core at a center having an outer radius $r_1$ and a refractive index $n_1$, an inner cladding layer provided on a periphery of the core having an outer radius $r_2$ and a refractive index $n_2$, a trench layer provided on a periphery of the inner cladding layer having an outer radius $r_3$ and a refractive index $n_3$, and an outer cladding layer provided on a periphery of the trench layer having an outer radius $r_4$ and a refractive index $n_4$. The refractive index $n_4$ may be substantially constant. The refractive index of the core portion $n_1$ is greater than any of the refractive indices of the inner cladding layer $n_2$, the trench layer $n_3$, and the outer cladding layer $n_4$. The refractive index of the trench layer $n_3$ is less than any of the refractive indices of the core $n_1$, the inner cladding layer $n_2$, and the outer cladding layer $n_4$. A width of the trench layer is defined as follows:

Equation 1

$$w_3 = r_3 - r_2 \quad (1)$$

The maximum refractive index of the core $n_{1max}$ is more than any of the refractive indices of the inner cladding layer, the trench layer, and the outer cladding layer, and the minimum refractive index of the trench layer $n_{3min}$ is less than any of the refractive indices of the core, the inner cladding layer, and the outer cladding layer.

Refractive index differences $\Delta_i$ of the central core (i=1), an inner cladding layer (i=2), and a trench layer (i=3) of an optical fiber respect to a refractive index of an outer cladding layer $n_4$ is calculated using the following equation:

$$\Delta_i = \frac{n_i^2 - n_4^2}{2n_4^2} \approx \frac{n_i - n_4}{n_4} \quad (i = 1, 2, 3) \qquad \text{Equation 2}$$

In Equation 2 above, $n_i$ denotes the refractive index of each portion (i) of the optical fiber as mentioned above. In this context, the refractive index difference $\Delta_i$ of each portion of the optical fiber is expressed in percent (%).

An optical fiber according to an exemplary embodiment has a large effective area at a wavelength of 1550 nm of between about 100 $\mu m^2$ and about 140 $\mu m^2$, and more preferably between 100 $\mu m^2$ and 130 $\mu m^2$. At the same time, the optical fiber exhibits a low macrobending loss at a wavelength of 1550 nm of less than about 0.5 dB for 10 turns at a bending radius of 15 mm (0.5 dB for 10 turns over a 15 mm radius is approximately equal to about 1.03 dB/m), preferably less than 0.25 dB for 10 turns at a bending radius of 15 mm (approximately equal to about 0.52 dB/m), and more preferably less than 0.10 dB for 10 turns at a bending radius of 15 mm (approximately equal to about 0.20 dB/m). Moreover, the optical fiber has a refractive index difference of a minimum refractive index of a trench layer $\Delta_{3min}$ with respect to a refractive index of an outer cladding layer $\Delta_{3min} = (n_{3min} - n_4)/n_4$ that is less than about −0.15% and more than about −0.30%. An optical fiber with the above effective area and macrobending loss and with a $\Delta_{3min}$ that is about −0.30% < $\Delta_{3min}$ < about −0.15% exhibits good macrobending loss performance while having a reduced manufacturing cost.

An optical fiber according to another exemplary embodiment has a ratio of an outer radius of an inner cladding layer to an outer radius of a core $r_2/r_1$ that is more than about 3.0 and less than about 4.5, and has a relative refractive index difference of a maximum refractive index of a core portion $n_{1max}$ with respect to a refractive index of an outer cladding layer $\Delta_{1max} = (n_{1max} - n_4)/n_4$ that is less than about 0.32% and more than about 0.15%. An optical fiber with the above characteristics that has a $\Delta_{1max}$ of about 0.32% < $\Delta_{1max}$ < about 0.15% exhibits a large effective area and a low macrobending loss.

An optical fiber according to another exemplary embodiment has a ratio of a width of a trench layer $w_3$ to an outer radius of a core $w_3/r_1$ that is more than about 1.5 and less than about 2.5.

An optical fiber according to another exemplary embodiment has a relative refractive index difference of a core portion respect to an inner cladding layer $\Delta_c = (n_1 - n_2)/n_2$ that is less than about 0.30% and more than about 0.20%. An optical fiber with the above characteristics that has 0.30% > $\Delta_c$ > 0.20% has a large effective area and a low macrobending loss.

An optical fiber according to the exemplary embodiments may be manufactured by a conventional chemical vapor phase deposition methods usually employed in the field of optical fiber manufacturing.

An outer phase vapor deposition method, such as vapor axial deposition (VAD) method and outside vapor deposition (OVD), produce a larger glass body of a central portion, for example, a core and an inner cladding layer, of an optical fiber at a higher deposition rate compared to inside tube vapor phase deposition methods. Since the VAD method has no theoretical limitation in a length of the glass body, it is advantageous to use the VAD method to economic reasons. The VAD and OVD methods, however, are suitable to produce only a simple refractive index profile, because a large soot glass composed of many deposited layers produced by a deposition of glass particles is sintered to a vitreous glass body at the same time. A more complicated refractive index profile of a glass may be obtained by combining repetitive sequences of deposition with a sintering process using outside vapor deposition. Thus, a trench layer may be deposited and sintered on an outer peripheral of a central portion composed a core and an inner cladding layer by a process of the outside vapor deposition method, and then an outer cladding layer may be deposited and sintered on an outer peripheral of the trench layer by a process of the outside vapor deposition method.

An inside tube vapor phase deposition method, such as a modified chemical vapor deposition (MCVD) method and a plasma-enhanced vapor phase deposition (PCVD) method, may produce the whole refractive index profile of an optical fiber according to the exemplary embodiments by depositing appropriate layers successively on an inside wall of a starting glass tube substrate in a single sequential procedure, because a tiny layer of deposited porous glass (soot glass) composed of glass particles on the inside wall of the starting glass tube substrate is sintered to a vitreous glass body in every step of the deposition. The MCVD and PCVD methods, however, produce only a small glass body limited by the size of the starting glass tube substrate.

An inside tube vapor phase deposition method may be combined with an outer phase vapor deposition method for production of an optical fiber according to the exemplary embodiments. For example, a central portion of a refractive index profile including a core and an inner cladding layer may be produced by the MCVD method and then an outer peripheral portion of the refractive index profile may be produced by the outside vapor deposition method. This combined method may produce an optical fiber having a precisely controlled refractive index profile.

ILLUSTRATIVE EXAMPLES

Figure 3:
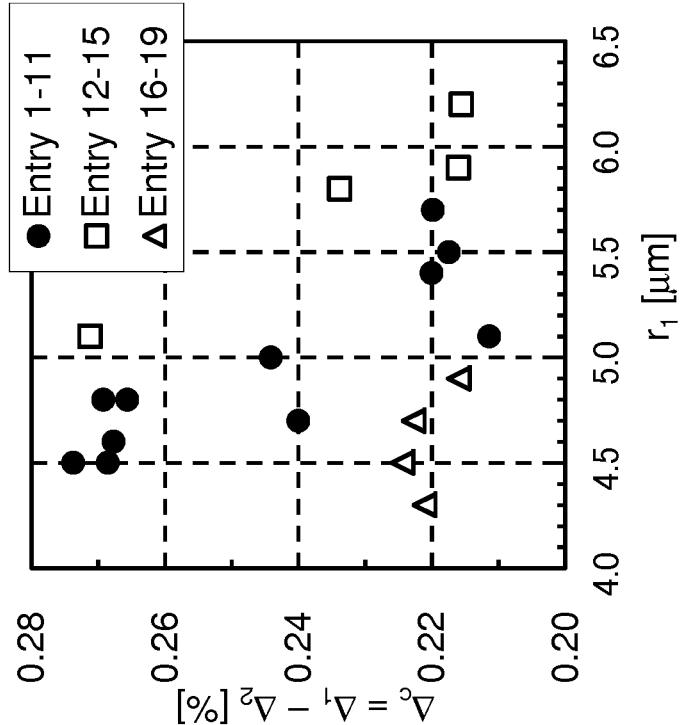
FIG. 3 shows a graph of a difference of relative refractive indices of the core and first cladding layer versus the radius of the core for the optical fibers shown in FIG. 2.

FIG. 2 shows data of illustrative examples of optical fibers according to exemplary embodiments and data of comparative examples, and FIG. 3 shows a graph of a difference of relative refractive indices of the core and first cladding layer against the radius of the core for the optical fibers of FIG. 2. In FIGS. 2 and 3, optical fiber entries 1-11 are optical fibers according to exemplary embodiments, and optical fiber entries 12-19 are comparative examples.

As shown in FIG. 2, the data includes effective area ($A_{eff}$), cable cutoff wavelength $\lambda_{cc}$, and macrobending loss.

The "effective area ($A_{eff}$)" is defined as follows:

$$A_{eff} = 2\pi \frac{\left(\int_0^\infty |F(r)|^2 r dr\right)^2}{\int_0^\infty |F(r)|^4 r dr} \quad \text{Equation 3}$$

In Equation 3, F(r) denotes the modal distribution of the fundamental mode (LP01) at a radius r.

The "cable cut-off wavelength" refers to the wavelength at which an optical signal is no longer single mode after propagating for 22 m in an optical fiber, and is measured as described by subcommittee 86A of the International Electrotechnical Commission (IEC) under standard IEC 60793-1-44.

The "macrobending loss" refers to the induced attenuation loss of the optical signal in the optical fiber when the optical fiber is bent at a particular bending radius, and is measured as described by subcommittee 86A of IEC under standard IEC 60793-1-47.

Entries 8-11 and 14-19

Optical fiber entries 8-11 and 14-19 in FIG. 2 are optical fibers having a trench layer, and were fabricated as follows.

A glass rod having a central portion of a refractive index profile corresponding to a central core and an inner cladding was manufactured first. A porous glass body (soot glass) manufactured by the VAD method was chemically dehydrated by heating at temperature of around 1000 degree C. in the presence of thionyl chloride ($SOCl_2$) as a dehydrating reagent, and then sintered by further heating at higher temperature of around 1500 degree C. and converted to a first glass rod of the central portion. The first glass rod was elongated until the radius of the first glass rod reached an appropriate radius for the next operation of the manufacturing process.

The outer peripheral of the first glass rod was deposited with a soot glass by outside vapor deposition. The soot glass coated on the first glass rod was chemically dehydrated by heating at temperature of around 1000 degree C. in the presence of thionyl chloride ($SOCl_2$) as a dehydrating reagent, and then sintered by further heating at higher temperature of around 1400 degree C. in the presence of tetrafluorosilane ($SiF_4$) as a fluorine-containing reagent. As the result, the soot glass coated on the first glass rod was doped with fluorine and sintered and then converted to a second glass rod of the central portion with a trench layer. The second glass rod was elongated until the radius of the rod reached an appropriate radius for the next operation of the manufacturing process.

The outer peripheral of the second glass rod was deposited with another soot glass by outside vapor deposition. The soot coated on the second glass rod was sintered by further heating at higher temperature of around 1500 degree C. and converted to a third glass rod, that was an optical fiber preform, having a refractive index profile desired in the present invention. The optical fiber preform was elongated until a radius of the preform reached an appropriate radius for the next operation of the manufacturing process.

The optical fiber preform was molten and drawn to an optical fiber having a certain diameter of, for example 125 μm, while heating one end of the optical fiber preform at temperature of around 2100 degree C.

Entries 1-7 and 12-13

Optical fiber entries 1-7 and 12-13 are optical fibers having a trench layer and were fabricated as follows.

A glass body having a central portion of a refractive index profile corresponding to a central core and an inner cladding was manufactured by the MCVD method. A glass tube (Suprasill-F300 made by Shin-Etsu Quartz Products Co. Ltd.) made of pure synthetic silica glass which contains hydroxyl group of less than 1 ppm, iron ion of less than 0.005 ppm, and aluminum ion of less than 0.05 ppm, and has an external diameter of 32 mm, a thickness of 2.5 mm, and a length of 800 mm was used as a starting substrate tube. The starting substrate tube formed an outer part of an inner cladding layer. An inner part of an inner cladding layer and a core were deposited on the inside wall of the starting substrate tube by a conventional MCVD method, and the resulting tube was collapsed to a first glass rod. The first glass rod was elongated until the radius of the first glass rod reached an appropriate radius for the next operation of the manufacturing process.

An outer peripheral portion containing a trench layer and an outer cladding was fabricated similarly to the above mentioned procedure for entries 8-11 and 14-19.

Description of Test Results

Each of the optical fibers with a trench layer was evaluated and effective area $A_{eff}$, cable cutoff wavelength, and macrobending loss were measured. Each of the optical fibers had a relative refractive index difference of the trench layer to a refractive index of an outer cladding layer $\Delta_{3min}$ that was between −0.30% to −0.15% and an effective area ($A_{eff}$) at a wavelength of 1550 nm of between 100 μm² and 145 μm².

Comparative optical fiber entries 12-15 had a large outer radius of the core $r_1$ of more than 5.0 μm and a ratio of a width of the trench layer to the outer radius of the core $w_3/r_1$ of less than 1.6, and exhibited a wavelength of a cable cutoff $\lambda_{cc}$ of more than 1529 nm.

Comparative optical fiber entries 16-19 had an outer radius of a core $r_1$ of less than 5.0 μm and a ratio of a width of the trench layer to the outer radius of the core $w_3/r_1$ of more than 2.2, and exhibited a macrobending loss at a wavelength of 1550 nm of more than 0.5 dB for 10 turns at a bending radius of 15 mm radius.

In contrast with the results of the comparative examples, optical fiber entries 1-7 according to exemplary embodiments had an outer radius of a core $r_1$ of between about 4.0 μm to about 5.0 μm and a ratio of a width of the trench layer to the outer radius of the core $w_3/r_1$ of less than about 2.1. Optical fiber entries 8-11 according to exemplary embodiments had an outer radius of the core $r_1$ of between about 5.0 μm to about 6.0 μm and a ratio of a width of the trench layer to the outer radius of the core $w_3/r_1$ of more than 1.6. Entries 1-11 exhibited a large $A_{eff}$, a small macrobending loss, and an appropriate cable cutoff wavelength at the same time, while also having a shallow relative refractive index difference of the trench layer to a refractive index of an outer cladding layer $\Delta_{3min}$ of between about −0.30% to about −0.15%.

In the cases of the comparative examples, Entries 14-15, that had a trench layer and an effective area ($A_{eff}$) larger than 140 μm² at a wavelength of 1550 nm, these comparative optical fibers did not exhibit simultaneously a small macrobending loss and an appropriate cable cutoff wavelength.

While exemplary embodiments have been particularly shown and described, it will be understood by those of ordinary skill in the art that various changes in form and details may be made therein without departing from the spirit and scope of the inventive concept as defined by the appended claims.

What is claimed is:

1. An optical fiber comprising:
    a core having an outer radius $r_1$ and a refractive index $n_1$;
    an inner cladding layer provided on a periphery of the core, the inner cladding layer having an outer radius $r_2$ and a refractive index $n_2$;
    a trench layer provided on a periphery of the inner cladding layer, the trench layer having an outer radius $r_3$ and a refractive index $n_3$; and
    an outer cladding layer provided on a periphery of the trench layer, the outer cladding layer having an outer radius $r_4$ and a refractive index $n_4$,
    wherein:
        a maximum refractive index of the core $n_{1max}$ is greater than $n_2$, $n_3$, and $n_4$,
        a minimum refractive index of the trench layer $n_{3min}$ is less than $n_1$, $n_2$, and $n_4$,
        a relative refractive index difference of a minimum refractive index of the trench layer to the refractive index of the outer cladding layer $\Delta_{3min}$ is between about −0.30% and about −0.15%,
        a relative refractive index difference of a maximum refractive index of the core to the refractive index of the outer cladding layer $\Delta_{1max}$ is from about 0.15% to about 0.32%,
        an effective area $A_{eff}$ at a wavelength of 1550 nm is from about 100 μm² to about 140 μm², and
        a macrobending loss at a wavelength of 1550 nm is less than about 0.5 dB for 10 turns at a bending radius of 15 mm,
        a cable cutoff wavelength is about 1300 nm to about 1500 nm,
        a ratio $r_2/r_1$ is from about 3.0 to about 4.5, and
        the outer radius $r_1$ and a ratio of a width of the trench layer to the outer radius of said core $w_3/r_1$ meet either one of the following:
            (i) the outer radius $r_1$ is from about 4.0 μm to about 5.0 μm and the ratio $w_3/r_1$ is less than about 2.1; and
            (ii) the outer radius $r_1$ is from about 5.0 μm to about 6.0 μm and the ratio $w_3/r_1$ is more than about 1.6.

2. The optical fiber of claim 1, wherein a relative refractive index difference of the core to the inner cladding layer $\Delta_c$ is from about 0.20% to about 0.30%.

3. The optical fiber of claim 1, wherein the effective area, $A_{eff}$, at a wavelength of 1550 nm is between 100 μm² and 130 μm².

4. The optical fiber of claim 1, wherein the macrobending loss at a wavelength of 1550 nm is less than 0.25 dB for 10 turns at a bending radius of 15 mm.

5. The optical fiber of claim 1, wherein the macrobending loss at a wavelength of 1550 nm is less than 0.10 dB for 10 turns at a bending radius of 15 mm.

* * * * *